US009853431B2

(12) United States Patent
Jones

(10) Patent No.: US 9,853,431 B2
(45) Date of Patent: Dec. 26, 2017

(54) ELECTRICAL BOX BRACKET

(71) Applicant: ERICO INTERNATIONAL CORPORATION, Solon, OH (US)

(72) Inventor: Ronald A. Jones, Cleveland Heights, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 15/373,546

(22) Filed: Dec. 9, 2016

(65) Prior Publication Data

US 2017/0093141 A1 Mar. 30, 2017

Related U.S. Application Data

(63) Continuation of application No. 14/715,065, filed on May 18, 2015, now Pat. No. 9,559,504.

(60) Provisional application No. 62/000,053, filed on May 19, 2014.

(51) Int. Cl.
*H02G 3/12* (2006.01)
*F16M 13/02* (2006.01)

(52) U.S. Cl.
CPC ............ *H02G 3/126* (2013.01); *F16M 13/02* (2013.01)

(58) Field of Classification Search
CPC ........ H02G 3/126; H02G 3/125; H02G 3/081; H02G 3/08; H02G 63/12; H02G 1/00; H02G 3/12; F16M 13/02; Y10T 29/49828
USPC ........................ 174/480, 481, 50, 53, 57, 58; 220/3.2–3.9, 4.02, 219.4; 248/906, 343
See application file for complete search history.

(56) References Cited

U.S. PATENT DOCUMENTS

| | | | | |
|---|---|---|---|---|
| 4,135,337 A | * | 1/1979 | Medlin | H02G 3/125 220/3.3 |
| 4,399,922 A | * | 8/1983 | Horsley | H02G 3/125 174/58 |
| 4,533,060 A | | 8/1985 | Medlin | |
| 4,688,693 A | | 8/1987 | Medlin, Jr. | |
| 4,964,525 A | * | 10/1990 | Coffey | H02G 3/125 220/3.9 |
| 5,386,959 A | | 2/1995 | Laughlin et al. | |
| 5,448,011 A | * | 9/1995 | Laughlin | H02G 3/126 174/480 |
| 5,450,974 A | * | 9/1995 | Lippa | H02G 3/126 220/3.8 |
| 5,595,362 A | | 1/1997 | Rinderer et al. | |
| 5,810,303 A | * | 9/1998 | Bourassa | H02G 3/126 174/58 |
| 5,965,844 A | | 10/1999 | Lippa | |
| 6,389,658 B1 | | 5/2002 | Pfaller et al. | |

(Continued)

OTHER PUBLICATIONS

Ramset Lather Clip Channel Hanger Installation Instructions; www.ramset.com; 1 page.

(Continued)

*Primary Examiner* — Angel R Estrada
(74) *Attorney, Agent, or Firm* — Quarles & Brady LLP

(57) ABSTRACT

A bracket is configured to secure a component, such as an electrical box, to a support member, such as a stud. The bracket can include an engagement portion, such as a snap-on arm, configured to interact with multiple surfaces of the support member. A biased or snap-on feature of the engagement portion can be configured to engage a side of the support member to secure the bracket to the support member.

20 Claims, 14 Drawing Sheets

(56) References Cited

U.S. PATENT DOCUMENTS

| | | | |
|---|---|---|---|
| 7,214,876 B1 * | 5/2007 | Haberek | H02G 3/126 |
| | | | 174/50 |
| 7,439,443 B2 | 10/2008 | Dinh | |
| 7,798,458 B2 | 9/2010 | Borbolla et al. | |
| 7,902,457 B2 | 3/2011 | Johnson | |
| 7,923,635 B2 | 4/2011 | Korcz et al. | |
| 8,403,289 B1 * | 3/2013 | Rinderer | H02G 3/126 |
| | | | 174/480 |
| 8,598,454 B2 * | 12/2013 | Laughlin | H02G 3/081 |
| | | | 174/53 |
| 8,702,047 B2 | 4/2014 | Nuernberger et al. | |
| 2009/0250573 A1 | 10/2009 | Nuernberger et al. | |

OTHER PUBLICATIONS

CADDY Fasteners for Stud Wall Applications; Copyright 2000 ERICO, Inc.; 4 pages.
Electrical Box Bracket brochure; retrieved from U.S. Patent Office records; 1 page.
CADDY C Series Electrical Box Bracket instruction sheet; retrieved from U.S. Patent Office records; 2 pages.

* cited by examiner

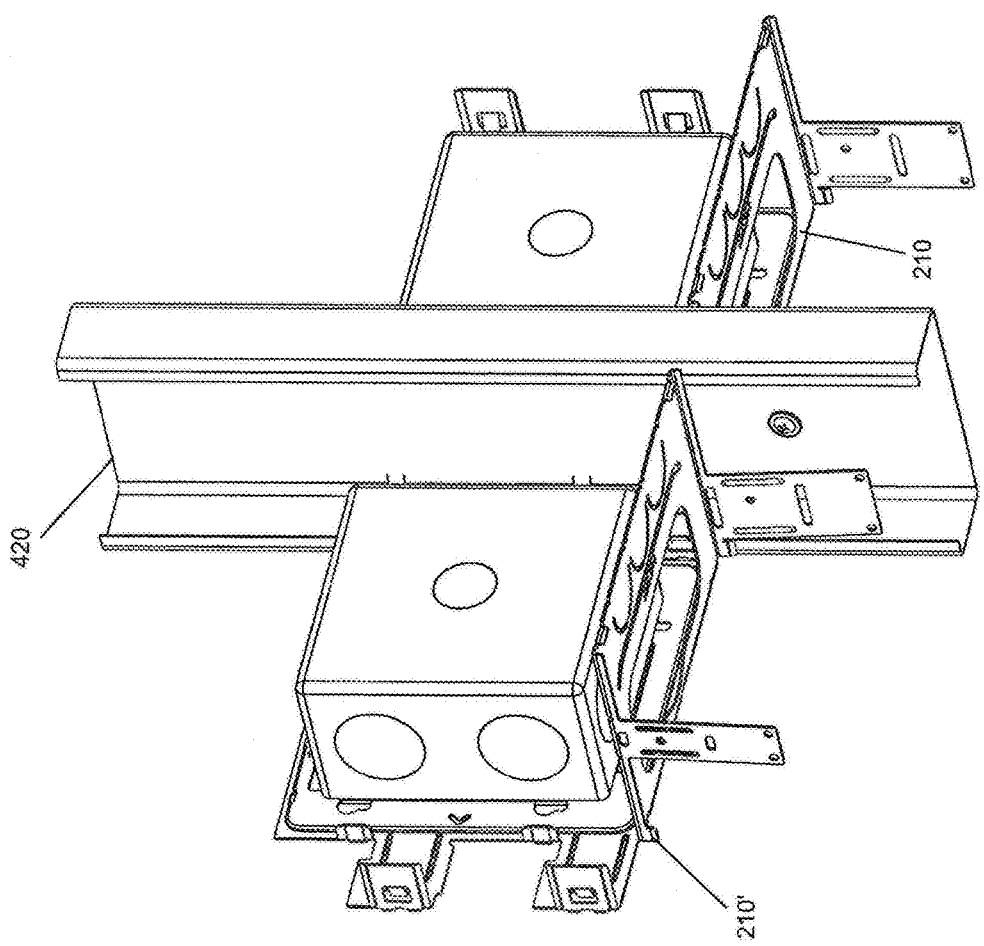

ELECTRICAL BOX BRACKET

This application is a continuation of and claims priority under 35 U.S.C. §120 to U.S. patent application Ser. No. 14/715,065, which was filed May 18, 2015 and claims priority under 35 U.S.C. §119 to U.S. Provisional Patent Application 62/000,053, which was filed May 19, 2014. The entire contents of both of the above-referenced priority applications are incorporated herein by reference.

BACKGROUND OF THE INVENTION

1. Technical Field of the Invention

The invention is in the field of electrical box mountings, such as brackets.

2. Description of the Related Art

Electrical box brackets have been used to mount electrical boxes and other devices to studs or other building structures. Improvements in mountings are desirable to deal with problems in current electrical box brackets, some of which are discussed below.

SUMMARY OF THE INVENTION

According to aspects of the invention, an electrical box bracket includes one or more of the following features: snap-on arms that allow easy mock-up and self-leveling of assembly; stud-lock tabs on snap-on arms provide positive retention to a metal stud; integral foldable legs that provide a secure installation to both the open or closed side of any depth metal stud; apertures with protrusions to provide positive retention of an electrical box (or other device) to the bracket; and/or an embossed front face for superior stiffness and flexural resistance.

According to other aspects of the invention, an electrical box bracket includes: a front face portion; and one or more mechanisms, operably coupled to the front face portion, for engaging a stud or other structure. The bracket may include one or more of the following features (individually or in any combination): stud-lock tabs; the stud-lock tabs are configured to engage opposite sides of a stud; the stud lock tabs can engage flanges of the stud and/or faces of the stud; one or more snap-on arms; the one or more snap-on arms include respective arm stud-lock tabs; the arm stud-lock tabs are in tabs of the arm that are perpendicular to the face portion and proximal portions of the arms; the tabs of the arm extend rearward from the proximal arm portions; foldable legs that provide a secure installation to both the open or closed side of any depth metal stud (for example); the legs are integral to the bracket; the face portion has apertures with protrusions to provide positive retention of an electrical box (or other device) to the bracket; the face portion is an embossed front face for superior stiffness and flexural resistance; an embossed portion of the face portion has a depth that corresponds to a material thickness of a mudring to be installed on the face portion; the embossed portion is rectangular; the face portion has a rectangular cutout or opening through which electrical wiring and/or the interior of an electrical box mounted to the bracket (or the contents of the box) may be accessed; the face portion has apertures to which an electrical box may be mounted; the apertures may be open slots; the apertures may have a keyhole shapes; protrusions on opposites of the apertures may operate to help retain screws of the electrical box; a far-side support; the far-side support is perpendicular to the face portion; the far-side support is bent back from the face portion; the far side support includes one or more legs; the far side support has an aperture therethrough, for example through which electrical cable or conduit may be passed; the far side support aperture may be vertical; the far side support aperture includes one or more feet, for example for bearing against dry wall; the feet of the far side support may be vertical (substantially parallel to the face portion); the far side support may have one or more undercuts, such as to accommodate a stud, or for mounting of shallow electrical boxes back-to-back; the legs are foldable legs; the legs can be folded to a position to engage a flat surface (such as a flat inner surface) of the stud; apertures in the bracket to facilitate folding of the legs; the legs have feet for pressing against stud faces; the legs have holes therein, such as for receiving fasteners; the legs each have a first position (e.g., unfolded) for engaging a closed side (face) of a stud; the legs each have a second position (e.g., folded) for engaging an open side (face) of a stud; stud tabs that extend rearward from the face portion; the stud tabs are perpendicular to the face portion; the stud tabs include respective stud-lock tabs for engaging the stud; there are two of the stud lock tabs extending from one side (edge) of the face portion; a stud arm is between the two stud lock tabs; there are two additional stud lock tabs extending from a second side (edge) of the face portion; another stud arm is between the two additional stud lock tabs; an arm stud lock tab can engage one side of a stud (engaging flat face or flange), while one or more (such as two) stud lock tabs can engage the opposite side of the stud (engaging flat face or flange); the engagement of two stud lock tabs on one side of a stud, above and below engagement of an arm stud lock tab on an opposite side of the stud, helps stabilizes and align installation of the bracket on the stud; the stud lock tabs of the stud tabs may be smaller than the arm stud-lock tab; the stud lock tabs of the stud tabs are angled relative to the rest of the stud tabs (such as bodies of the stud tabs); a snap-on arm has one or more apertures through which a screw or other fastener may be inserted, for example to secure the bracket to a stud; one or more snap-on arms may occupy a plane of a horizontal centerline of the electrical box bracket, or of an electrical box secure to the bracket; a pair of snap-on arms on opposite sides of the face portion may have different vertical locations, for example being located symmetrically above and below a centerline of the bracket, for example to allow a pair of brackets to be installed side-by-side using the same vertical stud, with the brackets mounting electrical boxes at the same vertical location (height); the one or more mechanisms may include the arm(s), the stud-lock tab(s), and/or the feet; the bracket may be made of a single piece of unitary continuous material; the bracket may be made of sheet metal; and/or the bracket may be made of sheet steel.

According to other aspects of the invention, a method of installing the bracket of the previous paragraph (any combination of features), includes: using the one or more mechanisms to secure the bracket to a stud, before final installation; finally securing the bracket to the stud, for example using one or more screws (or fasteners), or even a single screw or fastener.

According to another aspect of the invention, an electrical box bracket includes: a front face portion for receiving an electrical box; a far-side support connected to the front face portion; and a stud engagement mechanically coupled to the face portion and the far-side support; wherein the stud engagement mechanically engages multiple surfaces of a stud when the electrical box bracket is attached to the stud.

According to an embodiment of the bracket of any previous paragraph(s): the stud engagement includes: one or more first extensions from the front face; and one or more second extensions from the far-side support.

According to an embodiment of the bracket of any previous paragraph(s), the one or more first extensions include an arm that fits over a front face of the stud.

According to an embodiment of the bracket of any previous paragraph(s), the arm is a snap-on arm.

According to an embodiment of the bracket of any previous paragraph(s), the snap-on arm is an L-shape part that includes: a proximal leg that extends outward from the face portion, wherein the proximal leg overlies the front face of the stud; and a distal leg, bent at an angle from the proximal leg, wherein the distal leg engages a far side of the stud that faces away from the bracket.

According to an embodiment of the bracket of any previous paragraph(s), the distal leg includes a snap-on arm tab for engaging a side portion of the stud.

According to an embodiment of the bracket of any previous paragraph(s), the one or more first extensions also include additional tabs for engaging a side surface of the stud that is opposite from the side portion engaged by the snap-on arm tab.

According to an embodiment of the bracket of any previous paragraph(s), the second extensions include foldable legs that can be configured by an end user to engage, at different distances from the far-side support, a side surface of stud.

According to an embodiment of the bracket of any previous paragraph(s), the foldable legs can be selective configured between a first configuration for engaging an open side of the stud, and a second configuration for engaging a closed side of the stud.

According to an embodiment of the bracket of any previous paragraph(s), each of the foldable legs each has multiple elongate apertures therein, to facilitate bending of the leg relative to the far-side support, and to facilitate bending the a distal portion of the leg relative to a proximal portion of the leg.

According to an embodiment of the bracket of any previous paragraph(s), each of the foldable legs also has holes in the distal portion and the proximal portion, for receiving fasteners for connecting the legs to the stud in both the first configuration and the second configuration.

According to an embodiment of the bracket of any previous paragraph(s), the far-side support has stiffening flanges running a full length of opposite edges of the support.

According to an embodiment of the bracket of any previous paragraph(s), the stiffening flanges each have one or more holes therein for cutting the stiffening flanges, to reduce a depth of the support.

According to an embodiment of the bracket of any previous paragraph(s), the far-side support is configured for a rear portion to be foldable by an end user to reduce a depth of the support.

According to an embodiment of the bracket of any previous paragraph(s), the rear portion has a series of removable cutouts that may be removed to provide clearance for conduit fittings.

According to an embodiment of the bracket of any previous paragraph(s), the far-side support has a rear portion with feet for engaging a wall when the far-side support is at full depth.

According to an embodiment of the bracket of any previous paragraph(s), a main part of the far-side support has an edge for engaging a wall when the far-side support is at reduced depth, with the rear portion bent over against the main part.

According to an embodiment of the bracket of any previous paragraph(s) the front face portion is embossed, with a recessed central section surrounded by a border.

According to an embodiment of the bracket of any previous paragraph(s), the front face portion has open slots for receiving threaded fasteners mechanically coupled to an electrical box; and the front face portion has have protrusions that protrude inward from opposite sides of the slots, to aid in retaining the threaded fasteners within the slots.

According to an embodiment of the bracket of any previous paragraph(s), the bracket is in combination with a metal stud to which the bracket is attached.

According to an embodiment of the bracket of any previous paragraph(s), the bracket is in combination with an electrical box mechanically coupled to the bracket.

According to a further aspect of the invention, an electrical box bracket includes: a front face portion for receiving an electrical box; a far-side support connected to the front face portion; and a stud engagement mechanically coupled to the face portion and the far-side support; wherein the stud engagement mechanically engages multiple surfaces of a stud when the electrical box bracket is attached to the stud; wherein the stud engagement includes: one or more first extensions from the front face; and one or more second extensions from the far-side support; wherein the one or more first extensions include a snap-on arm that fits over a front face of the stud; wherein the snap-on arm is an L-shape part that includes; a proximal leg that extends outward from the face portion, wherein the proximal leg overlies the front face of the stud; and a distal leg, bent at an angle from the proximal leg, wherein the distal leg engages a far side of the stud that faces away from the bracket; wherein the distal leg includes a snap-on arm tab for engaging a side portion of the stud; wherein the one or more first extensions also include additional tabs for engaging a side surface of the stud that is opposite from the side portion engaged by the snap-on arm tab; wherein the second extensions include foldable legs that can be configured by an end user to engage, at different distances from the far-side support, a side surface of stud; wherein the foldable legs can be selective configured between a first configuration for engaging an open side of the stud, and a second configuration for engaging a closed side of the stud; wherein each of the foldable legs each has multiple elongate apertures therein, to facilitate bending of the leg relative to the far-side support, and to facilitate bending the a distal portion of the leg relative to a proximal portion of the leg; and wherein each of the foldable legs also has holes in the distal portion and the proximal portion, for receiving fasteners for connecting the legs to the stud in both the first configuration and the second configuration.

According to a still further aspect of the invention, a method of attaching an electrical box to a metal stud, the method includes: mounting an electrical box bracket to the metal stud; and coupling the electrical box to the electrical box bracket; wherein the mounting the electrical box bracket includes mechanically engaging a front and multiple sides of the metal stud with extensions of the mounting bracket.

According to another aspect of the invention, a mounting bracket can secure a component to a support member. The mounting bracket can include a mounting portion configured to support the component with the component disposed at least partly along a first side of the support member, and a snap-on arm connected to the mounting portion. The snap-on arm can include a first portion extending away from the mounting portion and configured to overlie a front face of the support member. The snap-on arm can further include a second portion extending at an angle relative to the first portion, with the second portion including a snap-on feature that is configured to engage a second side of the support member, opposite the first side, when the first portion of the snap-on arm overlies the front face of the support member, to secure the mounting bracket to the support member.

According to another aspect of the invention a mounting arrangement can secure a mounting bracket to a support member, with the mounting bracket supporting a component with the component disposed at least partly along a first side of the support member. The mounting arrangement can include a snap-on arm mechanically coupled to the mounting bracket and configured to mechanically engage multiple surfaces of the support member to secure the mounting bracket to the support member. The snap-on arm can extend away from the mounting bracket and include a bend that separates a first portion of the snap-on arm from a second portion of the snap-on arm. The first portion of the snap-on arm can be configured to contact a front face of the support member. The second portion of the snap-on arm can include a biased tab configured to contact a second side of the support member, opposite the first side of the support member, when the first portion of the snap-on arm contacts the front face of the support member, to secure the mounting bracket to the support member.

According to another aspect of the invention, a bracket can secure an electrical-system component to a stud, with the stud having front face, a closed side, and an open side. The bracket can include a mounting portion configured to receive the electrical-system component. A stud engagement can configured to engage the front face of the stud and at least one of the open side and the closed side of the stud, to attach the bracket to the stud. The stud engagement can include an engagement member with a bend and a biased engagement feature that is disposed on an opposite side of the bend from the mounting portion. The biased engagement feature can be configured to: with the bracket in a first orientation relative to the stud, engage the open side of the stud to secure the bracket to the stud; and, with the bracket in a second orientation relative to the stud, engage the closed side of the stud to secure the bracket to the stud.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 14 is an oblique view of the installation of FIG. 13.

DETAILED DESCRIPTION

An electrical box bracket includes features allowing it to engage multiple surfaces of a stud, such as a metal stud, to which it is mounted. The bracket has a front face for mounting an electrical box and a plaster ring, and a far-side tab bent backwards from the front face for making contact with a drywall behind the bracket. The front face has one or more snap-on arms on each of a pair of opposite sides, that fit over the front face of a metal stud to which the bracket is to be attached, with the snap-on arms each having a distal portion, with a snap-on arm tab, for engaging a side surface or the edge of a side flange of the stud on the distal side of the stud, the side farther away from the electrical box mounted on the bracket. The front face also has one or more flanges projecting rearward from the same opposite sides of the front face, with stud-lock tabs for engaging a side surface or edge of a side flange of a stud on the proximal side of the stud, the same side of the stud where the electrical box is located. The bracket may also have legs that extend from the far-side tab, where the legs are foldable by an end-user to engage side surfaces of the metal stud at different distances from the far-side tab. This allows the legs to be configured to engage the side surface of a C-shape stud either through the closed side or the open side. The bracket offers many advantages: the snap-on arms allow for easy mock-up and self-leveling; the integral foldable leg(s) on the far-side support allow secure installation on the open side of any size/depth stud; uniquely shaped keyhole apertures provide positive retention of an electrical box's screws; and the embossed part of the front face gives added rigidity.

Figure 1:
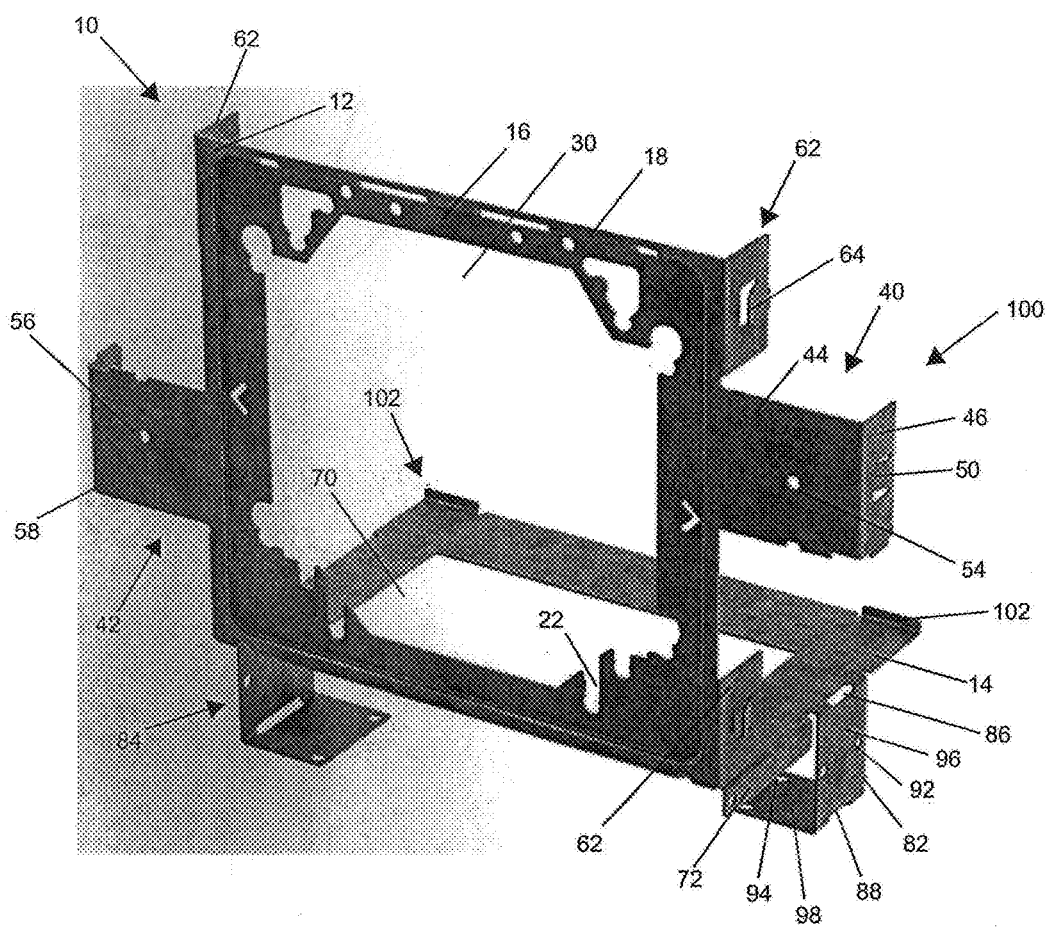
FIG. 1 is an oblique view of an electrical box bracket, according to an embodiment of the present invention.

Brackets on the market today provide no easy way to pre-position or "mock-up" a box/bracket assembly before installing a screw or screws. An installer typically attaches the assembly to a stud using at least two screws if he or she wants to even temporarily position said assembly. FIG. 1 shows an electrical box bracket 10 that is used to mount an electrical box to a metal stud, such as a C-shape metal stud laid over drywall or other material. The bracket 10 includes a front portion or face 12 that receives and secures an electrical box and a plaster ring ("mud ring"), and a far-side tab 14 that is bent back from the face 12. The far-side tab 14 is used to support the bracket 10 by pressing against drywall or other material that is behind the bracket 10. The stud that the bracket 10 mounts to may also be used to support the drywall or other material, for example with the drywall secured to a back surface to the stud.

The electrical box bracket 10 is a generally L-shaped bent or formed piece of sheet metal, such as sheet steel, with the legs of the "L" being the front face portion 12, and the far-side support tab 14 that extends rearwardly from a bottom edge of the front face portion 12. The front face portion 12 is embossed, with a recessed central section 16 produced by embossing, surrounded by a raised border 18. This embossing provides increased stiffness and improved flexural resistance. The amount by which the recessed section 16 is recessed may correspond to a thickness of material of a mudring that is placed against the face portion 12. For example the recessed portion 16 may be recessed by 1.78 mm (0.070 inches), to accommodate a mudring made from material that is 1.65 mm (0.065 inches) thick, although a wide variety of other amounts of recess are possible.

Figure 2:
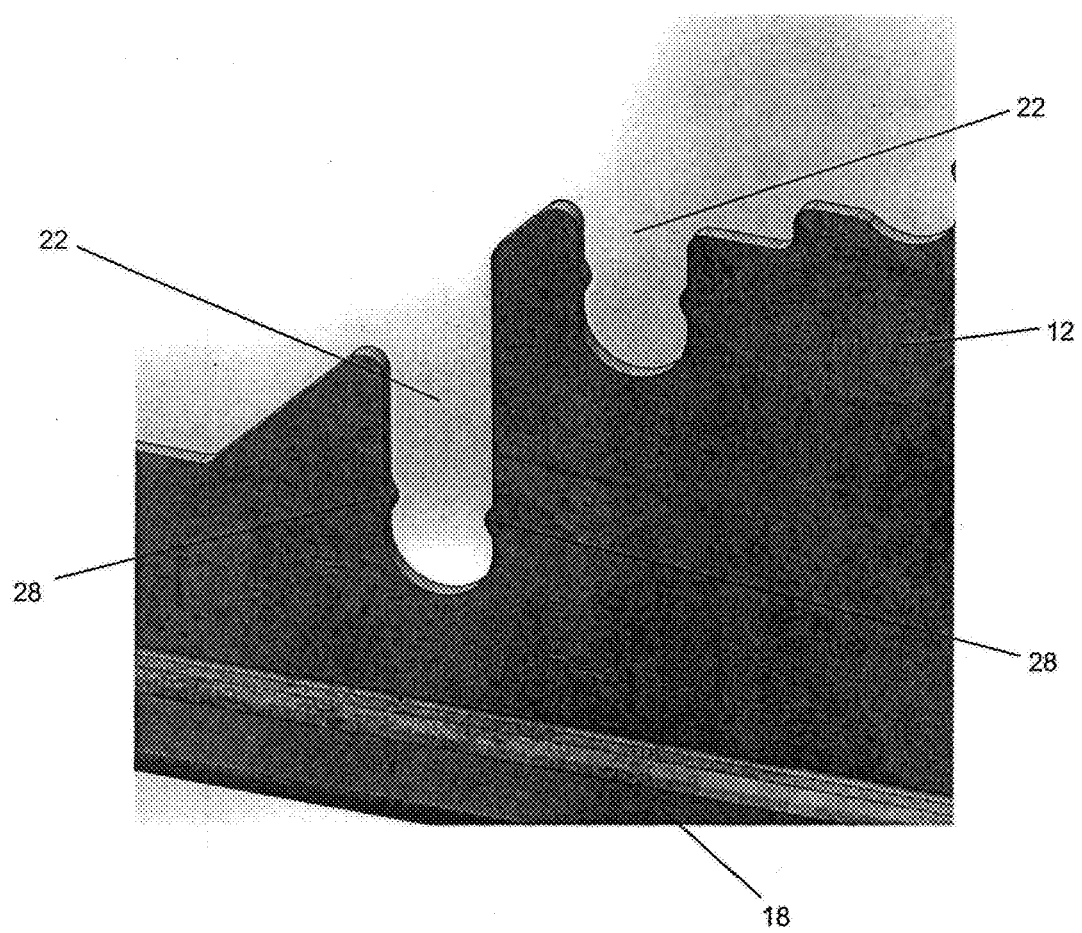
FIG. 2 is a detailed view of part of the bracket of FIG. 1.

The embossed face 16 features apertures 22 to which a large or small electrical box may be mounted. As mentioned above, the apertures 22 may be keyhole shaped, in that they have dual protrusions 28 on opposite sides of slots or apertures, as best seen in FIG. 2. The protrusions 28 protrude inward to narrow locally the apertures 22 to help retain the electrical box. For example the electrical box may have screws that are partially threaded into threaded holes in the electrical box. The shafts for these screws may easily pass between the protrusions 28 for the apertures 22, for example by sliding the box into place, with the screws then later fully tightened to secure the box to the bracket 10. The presence of the protrusions 28 provides a narrowing or constriction that helps keeps the screw shafts from accidently being dislodged from the apertures 22. There also may be other holes and slots to receive parts of electrical box and/or plaster ring, to secure these devices, or other devices, to the bracket 10.

Central to the embossed face 16 is a large rectangular opening 30 through which the electrical wiring is accessed. The opening 30 is shaped so as to accommodate a double-gang adjustable mud ring (plaster ring), for example.

The bracket 10 includes a number of extensions to aid in securing, temporarily or permanently, the metal stud, on either side of a C-shape stud. Some of these extensions extend from sides of the face portion 12, and others extend from the far-side tab or portion 14.

One type of extension are snap-on arms 40 and 42 that extend from opposite side edges of the front face portion 12. The snap-on arms 40 and 42 are L-shape structures that fit over a metal stud, and can be used to secure the bracket 10 to a metal stud. The L-shape structures include (for the snap-on arm 40) a proximal portion 44 that extends from the front face portion 12, and a distal portion 46. The proximal portion 44 is substantially in the plane of the front portion 12, and the distal portion 46 is bent downward from the proximal portion 44, for example at a right angle. In use, the proximal portion 44 extends across a front face or surface of a metal stud. The distal portion 46 extends downward along the far side of the metal stud, the side away from the electrical box and the main parts of the bracket 10. The distal portion 46 has a snap-on arm tab 50, an inward-bent portion (bent back toward the main parts of the bracket 10), that is used to engage a far side surface or flange of the metal stud. An aperture 54 in the proximal portion 44 may be used to receive a screw or other fastener to secure the snap-on arm 40 (and thus the entire bracket 10) to the metal stud. A self-tapping screw may be used for this purpose. The snap-on arm 42 may be similar in configuration to the snap-on arm 40, with an aperture 56 in a proximal portion 58.

The snap-on arms 40 and 42 allow the user to attach the assembly (the bracket 10, perhaps in combination with an electrical box and/or a plaster ring) to a stud without using any screws or fasteners whatsoever. This may be a temporary attachment for mock-up purposes, to make sure that the positioning is correct before it is made final. When the final positioning has been determined, the user only needs to use a single screw for the final installation, not two as required by most existing brackets. Alternatively, the snap-on arms 40 and 42 may be configured to be held in place by more than one screw or other fastener, with each of the arms 40 and 42 for instance having two holes for securing with two screws. Additionally, the snap-on arms 40 and 42 are positioned such that pre-assembly virtually guarantees a level bracket and box. There is no extra degree-of-freedom by which the bracket is allowed to cant on the stud, since stud-lock tabs may engage opposite sides of the stud, with the stud-lock tabs engaging flanges or faces of the stud. Aesthetically, a level box and bracket yields a level and attractive device and cover plate install.

Also extending from the left and right sides (opposite sides) of the embossed face portion 12 are four perpendicular tabs 62 that form a mechanism by which the bracket 10 can be snapped onto a metal stud. Specially, the mechanism includes of two of the rearwardly projecting tabs 62, each with a smaller, angled stud-lock tab 64. The stud-lock tabs 64 are bent away from the main part of the bracket 10 (away from the front face 12 and the far-side support 14). The tabs 64 may engage a side surface or a flange of the metal stud, in a manner similar to that of the snap-on arm tab 50, although on the opposite side of the stud (the proximal side of the stud, the side closest to the main part of the bracket 10).

The tabs 62 are used in conjunction with the snap-on arms 40 and 42, with their distal rearwardly-projecting portions and tabs, such as the distal portion 46 with its stud-lock snap-on arm tab 50. Each side's mechanism (the snap-on arms 40 and 42 and the tabs 62) is so configured as to allow positioning of two brackets side-by-side on the same metal stud while maintaining the same center line, allowing the electrical boxes to be side by side, on opposite sides of the metal stud at the same level. A side of each of the snap-on arms 40 and 42 is along the plane of the horizontal centerline of the electrical box, with the arm 40 above the centerline and the arm 42 below the centerline.

The far-side support tab 14 has in it a large rectangular aperture 70 through which electrical cable or conduit may be passed. On either side of the far-side tab 14, are perpendicular tab configurations, with tabs 72 that provide stiffening for the structure of the bracket 10. The tabs 72 may also have means for screw insertion, such as holes, for attachment to side surfaces of a strut, or to other objects.

Also on opposite sides of the far-side support 14 are integral foldable legs 82 and 84. Each foldable leg 82 and 84 has various apertures to allow bending or screw insertion. For example the leg 82 has a pair of elongate slots 86 and 88, and pairs of fastener holes 92 and 94. The elongate slot 86 is located where the leg 82 emerges from the support tab 14. The slot 86 allows bending of the leg 82 as a whole, relative to the far-side support 14, at that point. The elongate slot 88 is located between a proximal part 96 of the leg 82, and a distal part or foot 98 of the leg 82. The fastener holes 92 in the proximal part 96, and the fastener holes 94 in the distal part 98, may be used to attach the leg 82 to a side surface of a metal stud. The leg 84 has similar features. The legs 82 and 84 may be used in the positions shown in FIG. 1 to attach to the closed side of a metal stud (with the side surface of the metal stud running right along the edge of the bracket 10). The legs 82 and 84 also may be bent by 90 degrees or so to use the distal part or foot (perpendicular to the proximal part) for attachment to inside surface of a closed-side stud, through the open side of the stud.

The snap-on arms 40 and 42, the tabs 62, and/or the foldable legs 82 and 84, constitute a stud engagement 100 for engaging more than one surface of a metal stud. For example, the stud engagement may engage a front face of a stud, and a side flange and/or side surface of the stud.

The rear-most edge of the far-side support tab 14 contains one or more perpendicular feet 102 for bearing against dry wall. The feet 102 are bent up portions of the tab 14, and they help anchor and support the bracket 10 by pressing against dry wall that underlies the metal stud.

The far-side support tab 14 may include other features, such as undercuts to accommodate a 2½" stud, or for mounting of shallow electrical boxes back-to-back. These undercuts may facilitate suitable bending and/or cutting of parts of the far-side support 14.

The bracket 10 has many advantages over many prior brackets. Prior box brackets have no means by which the bracket can be securely attached to the open side of a C-shape metal stud. While the bracket is always screwed to the front/face side of the stud, there is no way to use a screw to secure the side of the bracket to the inside face when it also happens to be the open side of the stud. Having no attachment beyond the lateral face of the stud is acceptable in theory, but the ability to secure the bracket longitudinally offers many positive installation advantages. Firstly, it ensures that other tradesmen, like dry-wallers and insulators, cannot damage/disturb the electrical installation by pushing the assembly back inside the wall or bending it out of the way completely to make their job easier. Secondly, it will allow the bracket 10 to work at the same level of rigidity on any stud depth and on either side of the stud. Thirdly, because the foldable legs 82 and 84 are integral to the far-side support 14 of the bracket 10, this can all be achieved with no secondary loose (separate) parts that require additional effort from the installer to attach the leg to the assembly. Additionally, the legs in their unfolded states are also the means by which longitudinal attachment is attained on the closed side of a metal stud.

Past brackets, as well as many on the market today can be quite flimsy. This is because the National Electric Code sets minimum material thickness at only 0.5 mm (0.020 inches). While this provides cost savings to the manufacturer, it creates an issue for the electrician because the brackets are so easy to bend (typically by other tradesmen, as described earlier). The box brackets described herein achieve greater flexural strength due to their embossed front faces. Prior brackets feature a flat front face with offset tabs extending forwardly and radially from said face. While these offset tabs do offer some increases in strength, they do not achieve the same level of stiffness as an embossment. This added strength is especially important in "pre-fab" applications where the boxes and brackets are pre-assembled and shipped to a job site. A stronger bracket will suffers less—if any—damage during transportation from the fab center to the job site.

Another feature important to electrical "pre-fabbers" is the unique design of the apertures which accept the mounting screws of an electrical box. Keyhole shaped, they feature dual protrusions which help retain the electrical box. Boxes on the market today feature simple slots into which the screws slide. During rough handling, transportation, or installation, the screws are permitted to slip out of the slots if conditions allow. With the uniquely shaped apertures on the bracket 10, this is far less likely, as the screw threads must push past the slight protrusions that effectively lock the box to the bracket. To retain the box, all the installer has to do is use a little more force to push each screw past the protrusions to lock the box in place.

Figure 3:
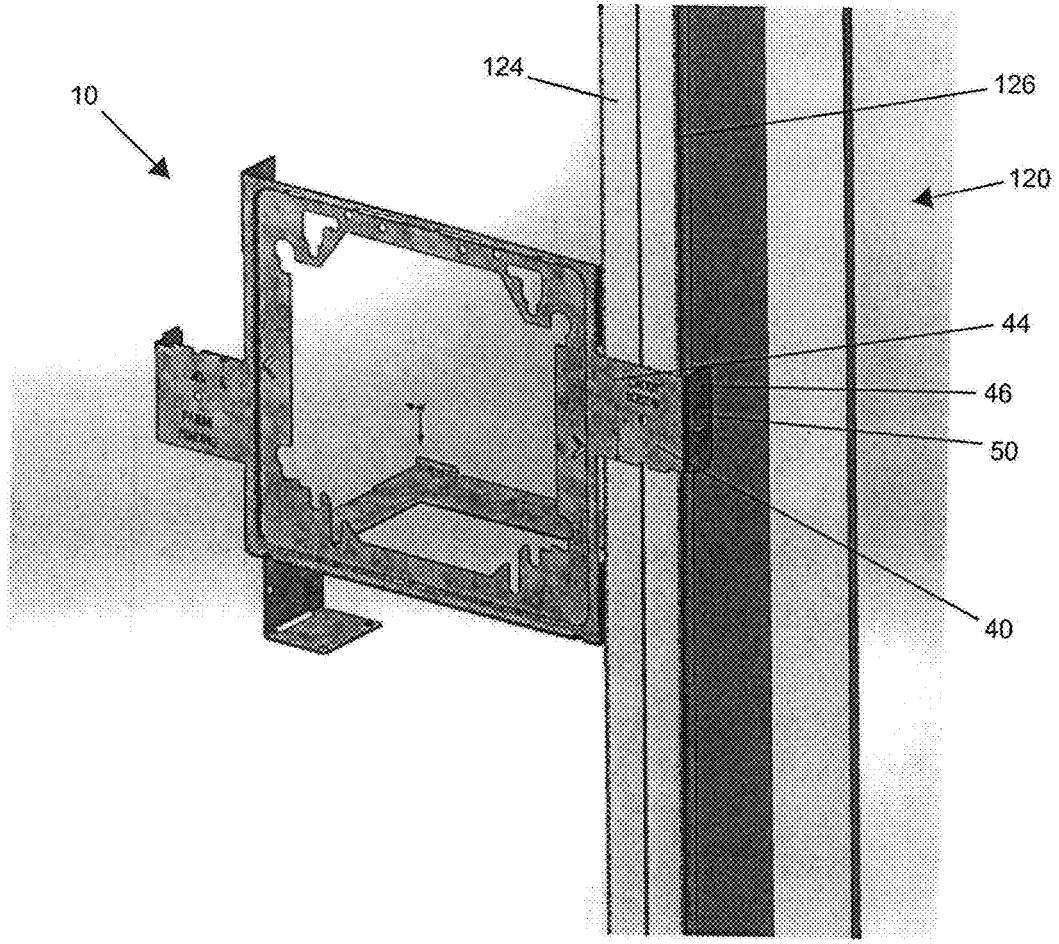
FIG. 3 is an oblique view showing the bracket of FIG. 1 installed on a stud.
Figure 4:
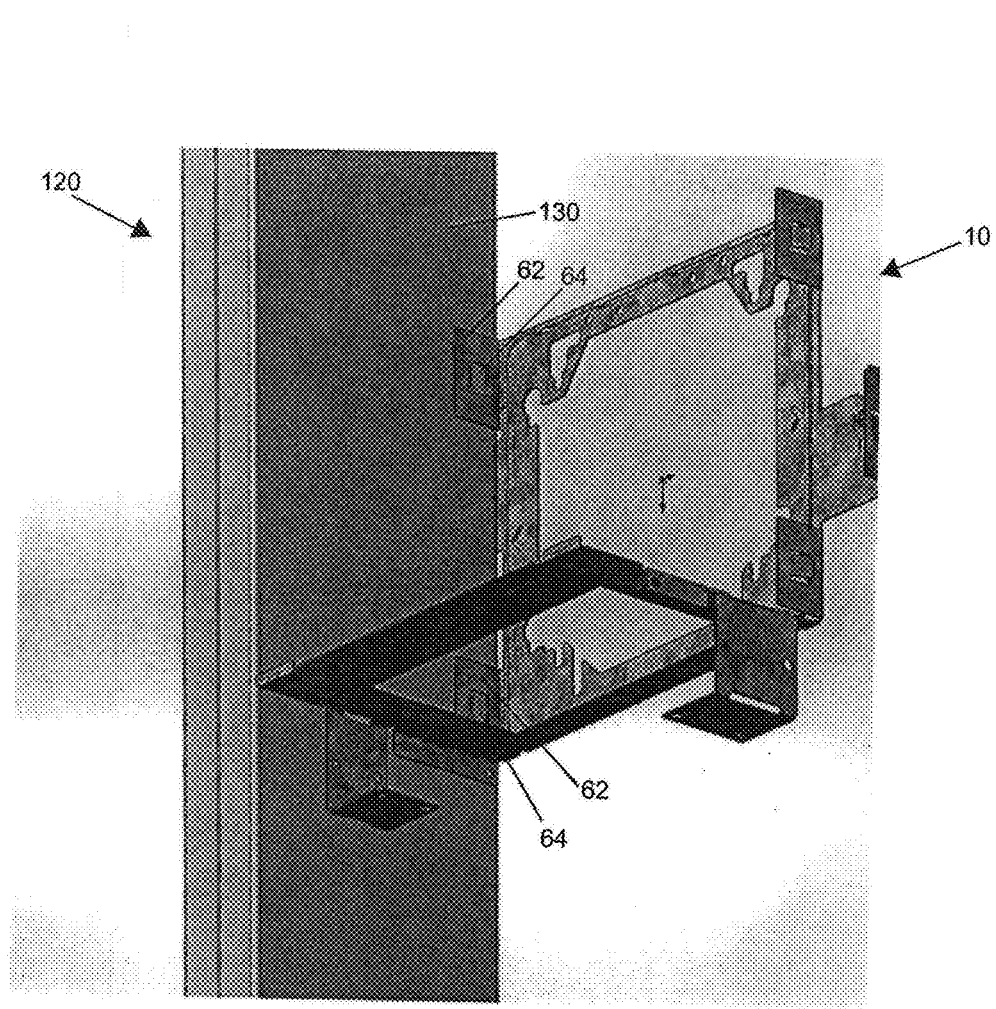
FIG. 4 is another oblique view of the installation of FIG. 3.
Figure 5:
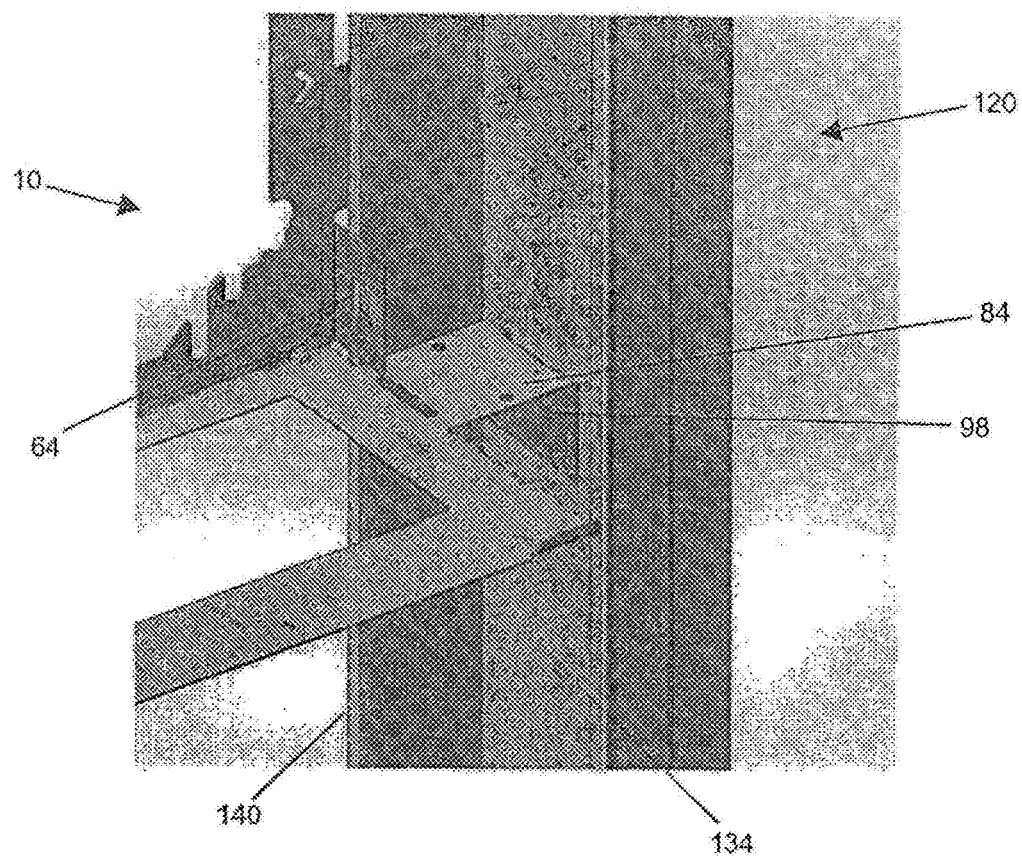
FIG. 5 is an oblique view of another installation of the bracket of FIG. 1, on a stud.

FIGS. 3-5 show engagement of the bracket 10 with a stud 120, such as a metal stud. FIG. 3 shows the snap-on arm 40 engaging the stud, with the proximal portion 44 overlying a front face 124 of the stud 120, and with the stud-lock snap-on tab 50 of the distal portion 46 aiding in holding the arm 40 in place by engaging a side flange 126 of the stud 120.

FIG. 4 shows use of the stud-lock tabs 64 of the stud tabs 62 used to engage and press against a flat outer surface side surface 130 of a middle section of the stud 120, to aid in keeping a snap-on arm 40 (FIG. 3) in place. The stud-lock tabs 64 of the stud tabs 62, and the stud-lock tab 50 of the snap-on arm 40, may be used to engage opposite sides of the stud 120, to hold the arm 40 in place.

FIG. 5 shows use of the integral foldable leg 84, with the leg folded out to press a foot 98 of the leg 84 against the flat inside surface 134 of the stud 120, to also help keep the bracket 10 coupled to the stud 120. FIG. 5 also shows a stud-lock tab 64 used to engage a stud flange 140.

Many alternatives are possible. While the configuration shown and discussed herein is for supporting a single electrical box, similar features could also be applied to a bracket that supports multiple electrical boxes. The bracket also could be applied to a telescoping box bracket. As another alternative, instead of stud-lock tabs, the snap-on arms could employ dimples. Also, it will be appreciated that some of the features of embodiment described above (the embossed face, the snap-on arms, the stud-lock tabs, the foldable legs, the far support legs, etc.) may be omitted in an alternative embodiment that still achieves at least of some of the advantages described above (from the features not omitted).

As a further (and more specific) alternative, the snap-on arms 40 and 42 could instead be simpler, omitting one or more of the parts or features described above. For instance the arms may be simple flanges that extend across part of the front face of the stud, with one or more holes for receiving a fastener or fasteners for securing the flange to the from face of the stud. Such flanges would not snap on to the stud, but would be arms that could be secured to the stud without snapping on to the stud.

Figure 6:
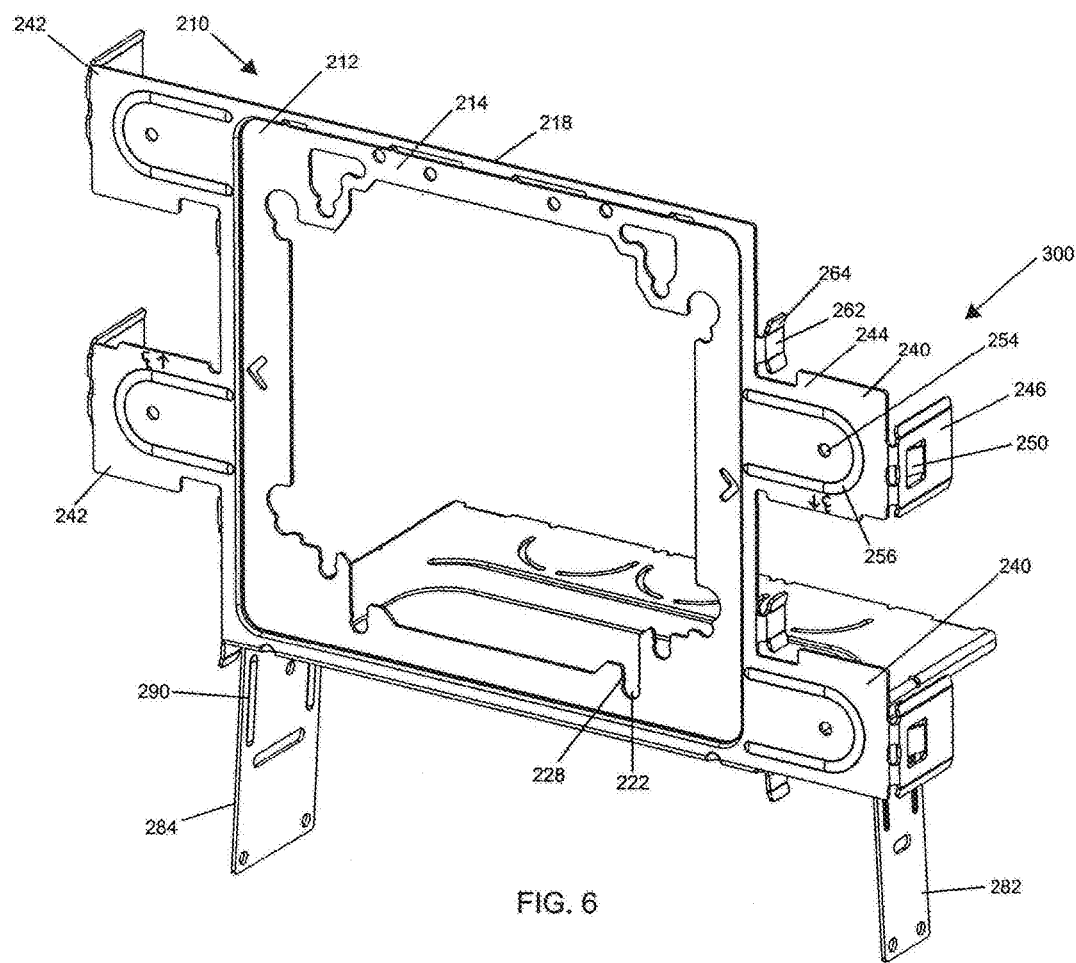
FIG. 6 is an oblique view of an electrical box bracket, according to another embodiment of the present invention.
Figure 7:
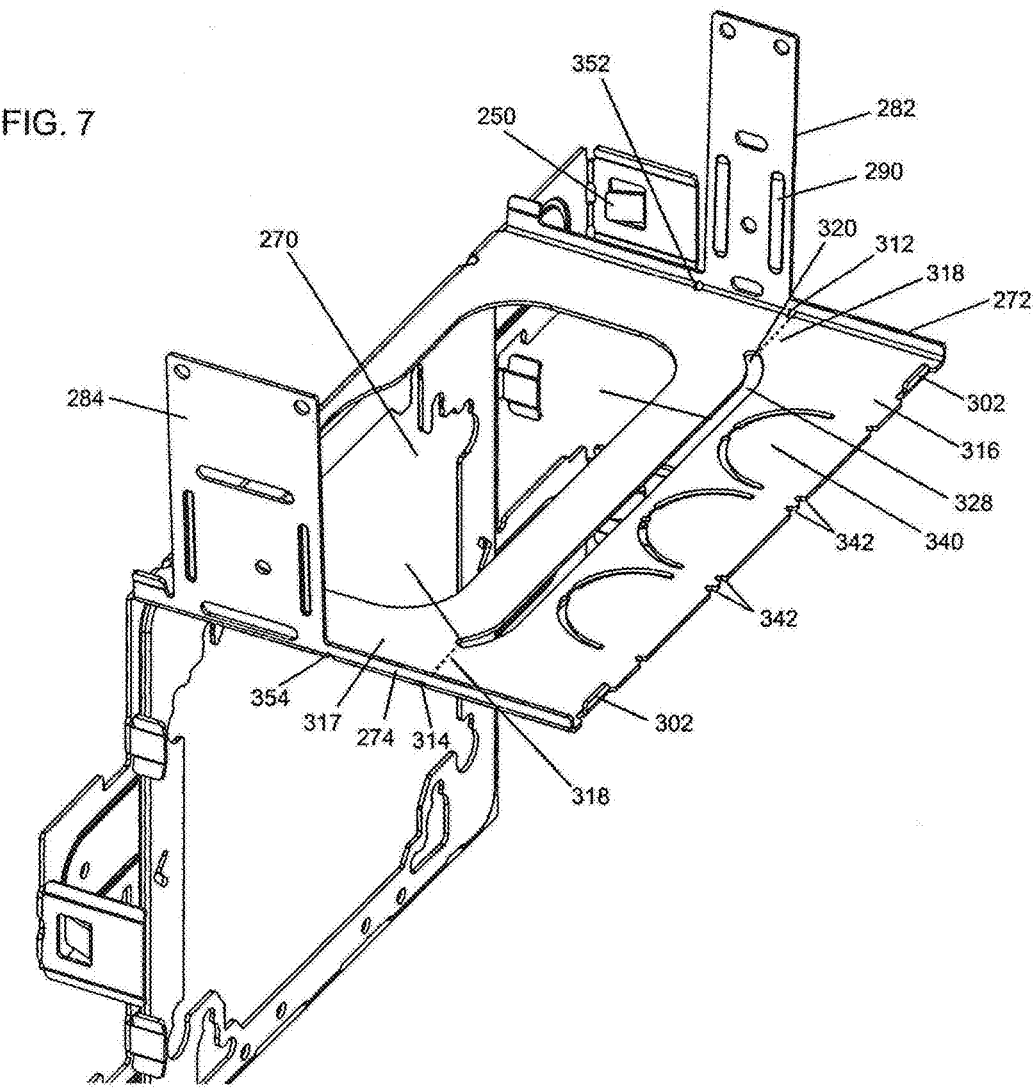
FIG. 7 is another oblique view of the bracket of FIG. 6.

FIGS. 6 and 7 show an alternative electrical box bracket, a bracket 210, also used for coupling an electrical box and/or a plaster ring to structure, such as a metal stud. Many features of the bracket 210 are similar to those of the bracket 10 (FIG. 1), and some discussion of similar features is abbreviated or omitted in the following description. It should be understood that discussion of the features of the bracket 10 should be considered incorporated into the discussion of the bracket 210, except where differences between the brackets 10 and 210 preclude the features of two brackets being the same.

The bracket 210 includes a front face portion 212 and a far-side support 214 connected to the front face portion 212. The face portion 212 and the support 214 are continuous unitary parts of a single piece of material (as is all of the bracket 210), with the support 214 bent from the face portion 212 at a right angle.

The face portion 212 is similar in features and configuration to the face portion 12 (FIG. 1), having a recessed central section 216 produced by embossing, surrounded by a raised border 218, with apertures 222 for mounting an electrical box, some of the apertures 222 having protrusions 228 to aid in retaining screws. An opening 230 is surrounded by the recessed (embossed) central section 216.

The bracket 210 has pairs of snap-on arms 240 and 242 that extend from opposite side edges of the front face portion 212. This is in contrast to the bracket 10 (FIG. 1), which only had a single snap-on arm on each side. The snap-on arms 240 are offset from the arms 242 in height along their respective edges of the front face portion 212. This allows two brackets to be mounted at the same height on opposite sides of a metal stud, with the arms 240 of one bracket interdigitating with the arms 242 of another bracket, as explained further below.

Individual of the arms 240 and 242 have similar configurations to the snap-on arms 40 and 42 (FIG. 1) of the bracket 10 (FIG. 1). That is, each of the snap-on arms 240 and 242 has a proximal portion 244 extending out from the plane of the front portion 212, and a distal portion 246 bent to be perpendicular to the proximal portion 244, extending rearward. The distal portion 246 has a snap-on arm tab 250 for engaging a side surface or side flange of a metal stud. The proximal portion 244 has a hole or aperture 254 for receiving a screw or other fastener. One added feature of the snap-on arms 240 and 242 is that the proximal portions 246 each have a U-shape raised rib 256, to strengthen the arms 240 and 242.

The bracket 210 has four perpendicular tabs 262 extending perpendicular to the front face portion 212. Each of the tabs 262 has a pair of wings or side tabs 264 which perform a similar function to the stud-lock tabs 64 (FIG. 1) of the bracket 10, with the wings 264 able to engage a side surface or flange edge of a metal stud.

The far-side support 214 has a rectangular opening 270, and has full-length stiffening flanges 272 and 274. The flanges 272 and 274 provide greater stiffening support than the tabs 72 and 74 (FIG. 1) of the bracket 10 (FIG. 1).

Integral foldable legs 282 and 284 are on opposite sides (edges) of the far-side support 214, integrated with the stiffening flanges 272 and 274. The legs 282 and 284 are similar in configuration and function to the foldable legs 82 and 84 (FIG. 1). One additional feature of the legs 282 and 284 is stiffening ribs, such as at 290, for stiffening the proximal portions of the legs 282 and 284. The snap-on arms 240 and 242, the tabs 262, and/or the foldable legs 282 and 284, constitute a stud engagement 300 for engaging more than one surface of a metal stud.

The far-side support 214 has perpendicular (upturned) feet 302, used for bearing against a wall surface when the bracket 210 is used with a full-depth stud. For use with a shallower stud, such as a 2½" stud, the bracket 210 may be modifies by making cuts in the stiffening flanges 272 and 274 where small holes 312 and 314 are located at the bases of the flanges 272 and 274. This allows bending of a rear part 316 of the far-side support 214, relative to a main part 317 of the support 214, along bend lines 318 that from the small holes 312 and 314, to the curved ends 320 of an elongate slot 322 along one side of the rear part 316. The ends 320 are curved toward the border between the face portion 212 and the far-side support 214. This leaves exposed an edge portion 328 of the far-side support 214 that is beyond the bend lines 318, after the rear part 316 is folded over. This edge portion 328, specifically its edge, bears against the wall surface when the bracket 210 is used with a shallower 2½" stud.

Figure 8:
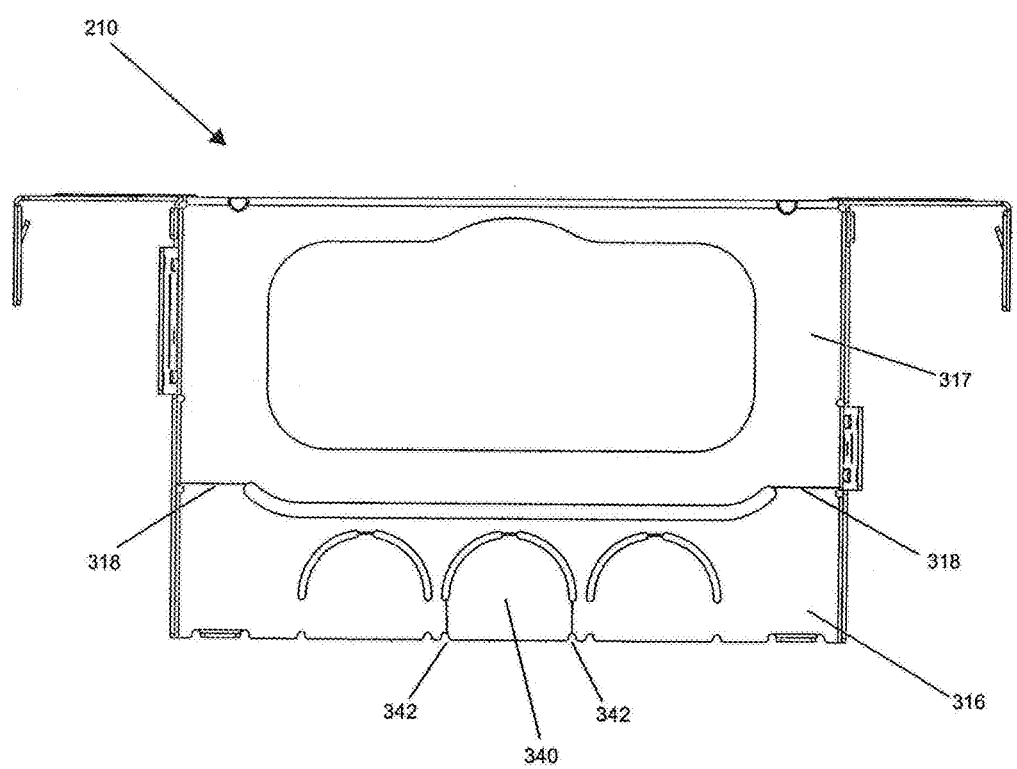
FIG. 8 is a plan view of a first step in a process of configuring the bracket of FIG. 6.
Figure 9:
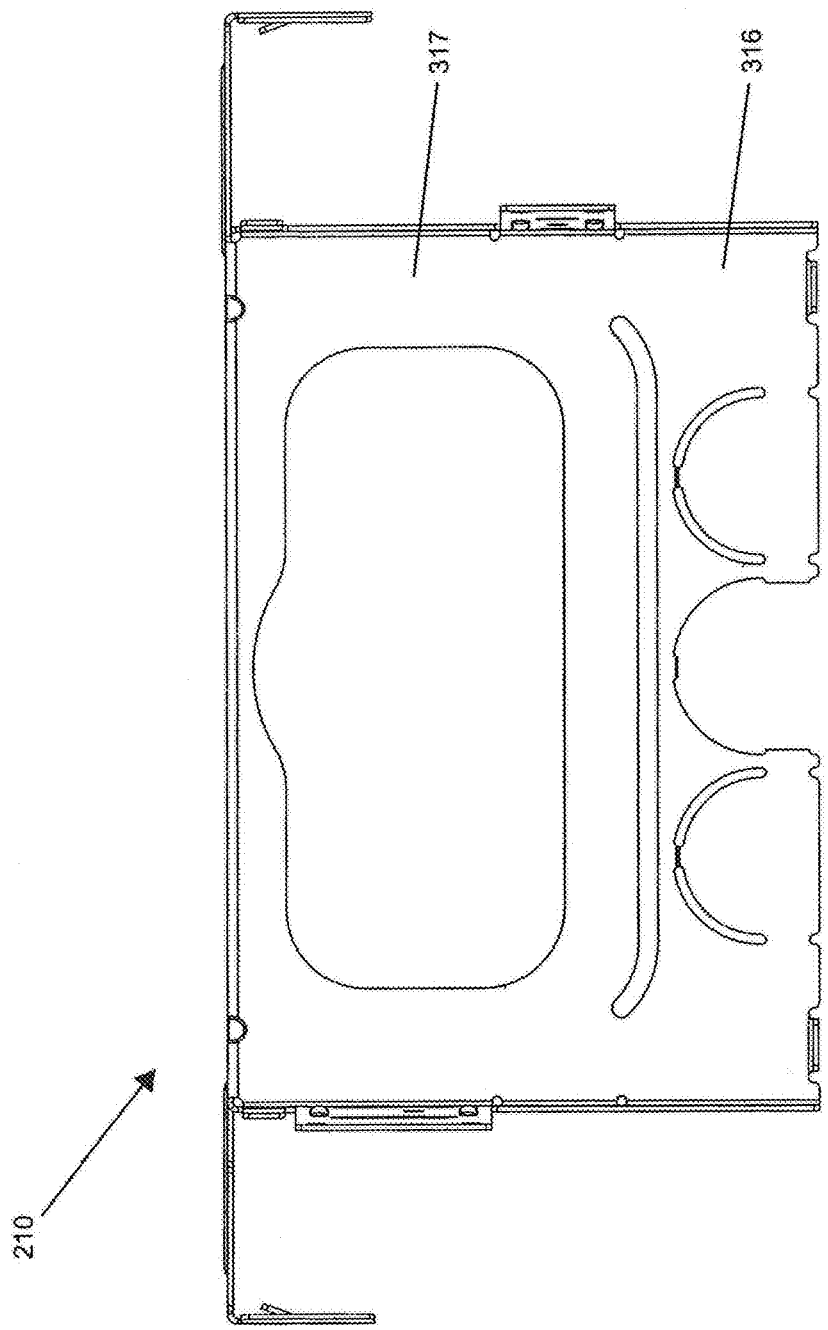
FIG. 9 is a plan view of a second step in the process of configuring the bracket of FIG. 6.
Figure 10:
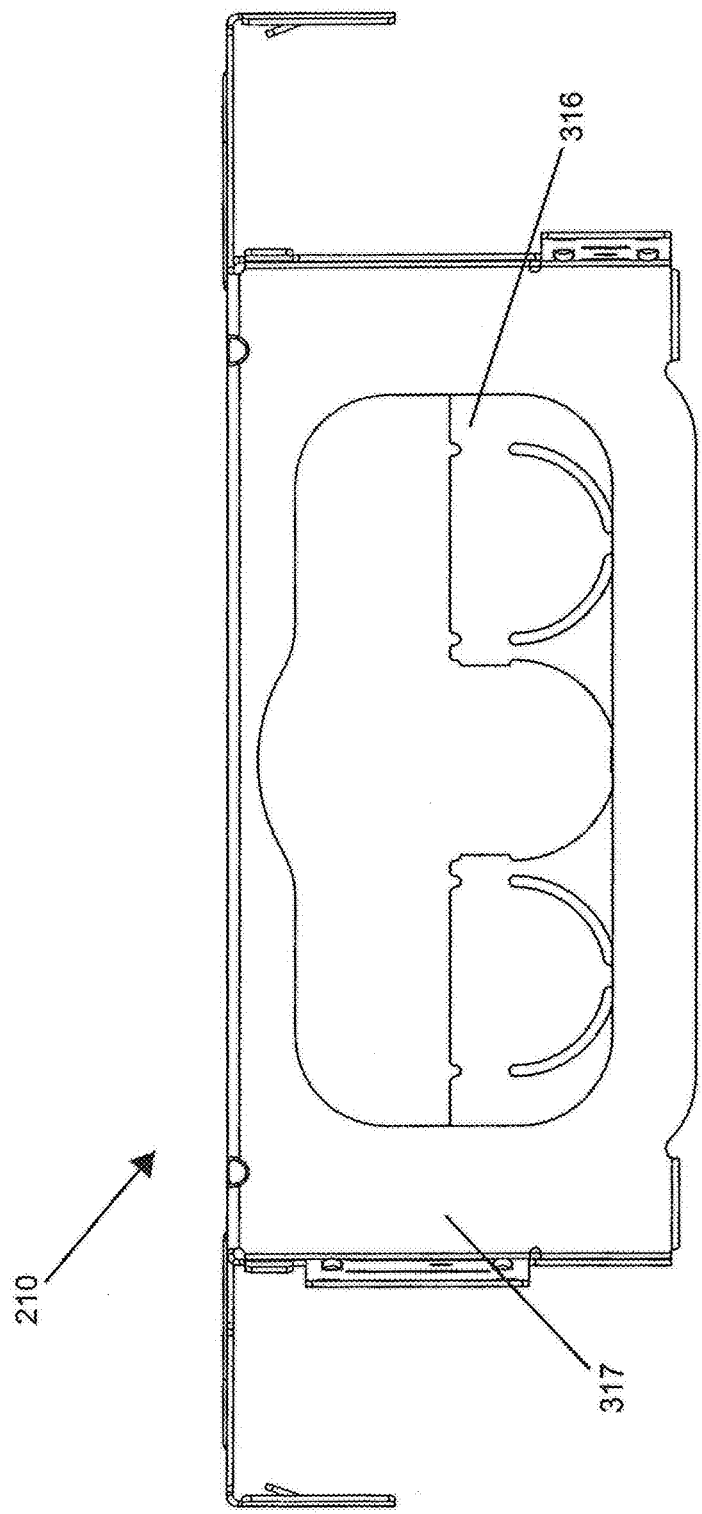
FIG. 10 is a plan view of a third step in the process of configuring the bracket of FIG. 6.

For use with a shallower stud, the rear part 316 is folded over 180 degrees at the bend lines 318, to double up with thickness over part of the support 214. This covers up part of the opening 270 in the support 214. This can interfere with clearance for conduit fittings that are to pass through the opening 270 to be installed on the electrical box. To handle this possibility the rear part 316 has a series semicircular slots, producing a series of half moon cutouts 340 that may be removed as needed to provide space for conduits. To remove one of the cutouts 340, an end user cuts along the appropriate notches 342 to the corresponding semicircular slot. The process of removing one of the cutouts 340, and then folding the rear part 316, is illustrated in FIGS. 8-10.

For mounting back-to-back shallow electrical boxes it may be desirable to remove part of the far-side support 214. To accomplish this the support 214 has small holes 352 and 354 that are located at the bases of the flanges 272 and 274. An end user cuts the flanges 272 and 274 at the holes 352 and 354, and then cuts inward to the opening 270 in the center of the support 214.

In the illustrated embodiment the distance between the holes 312 and 352 limits the width of the leg 282. The leg 284, which is not so limited, is wider than the leg 282.

Figure 11:
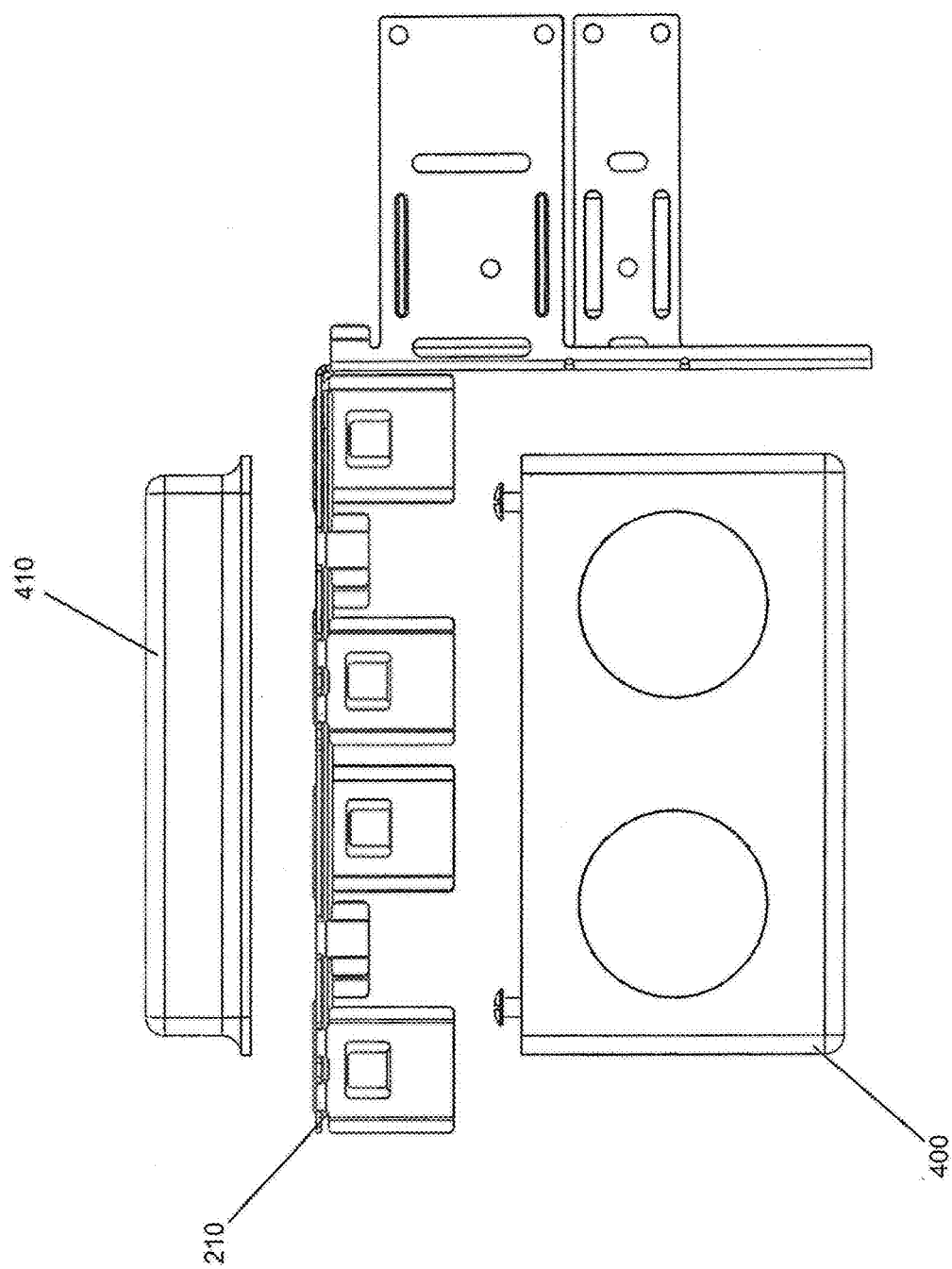
FIG. 11 is an exploded view of the combination of an electrical box, a plaster ring, and the bracket of FIG. 6.
Figure 12:
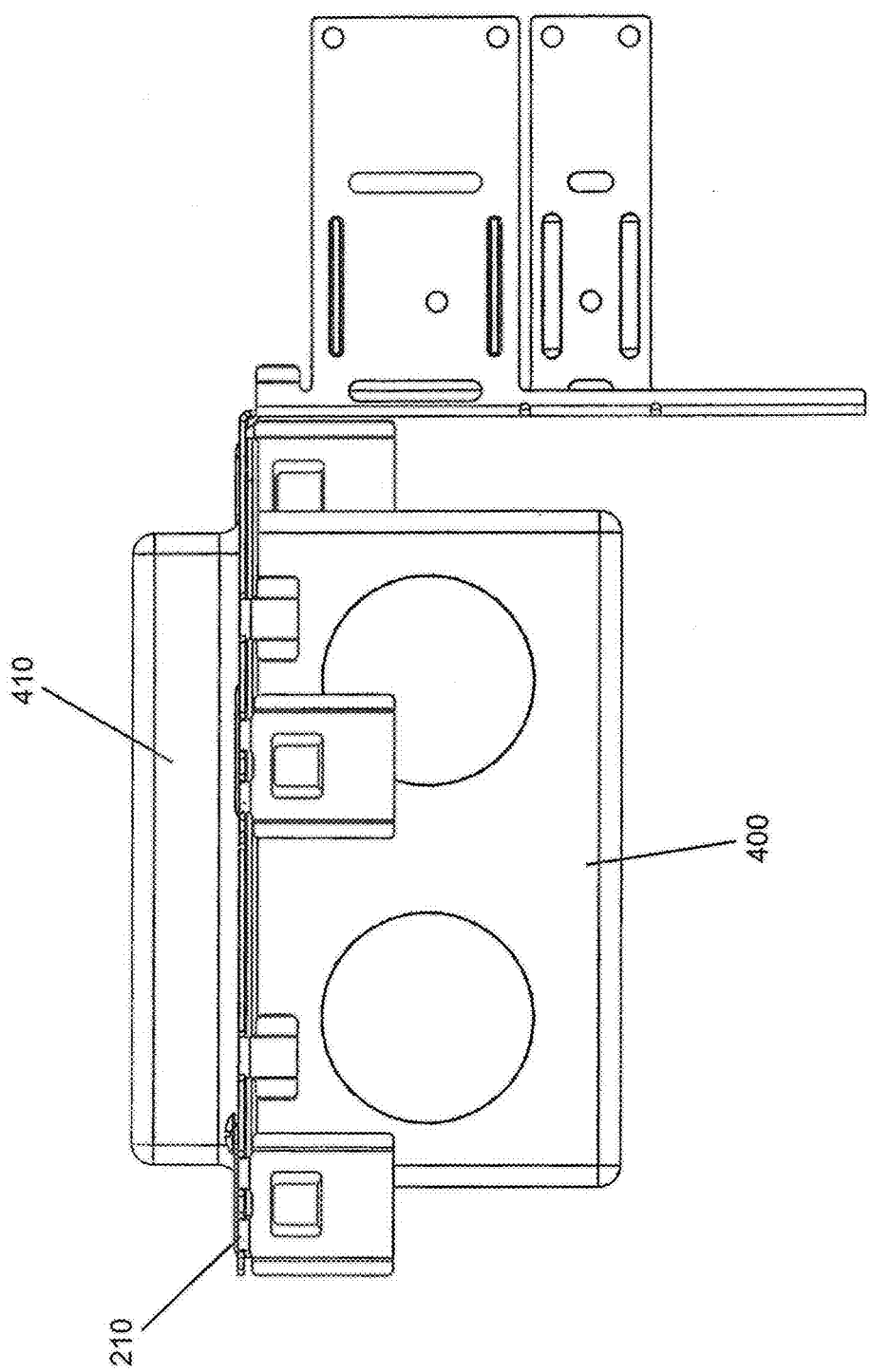
FIG. 12 is a side view showing the components of FIG. 11 coupled together.
Figure 13:
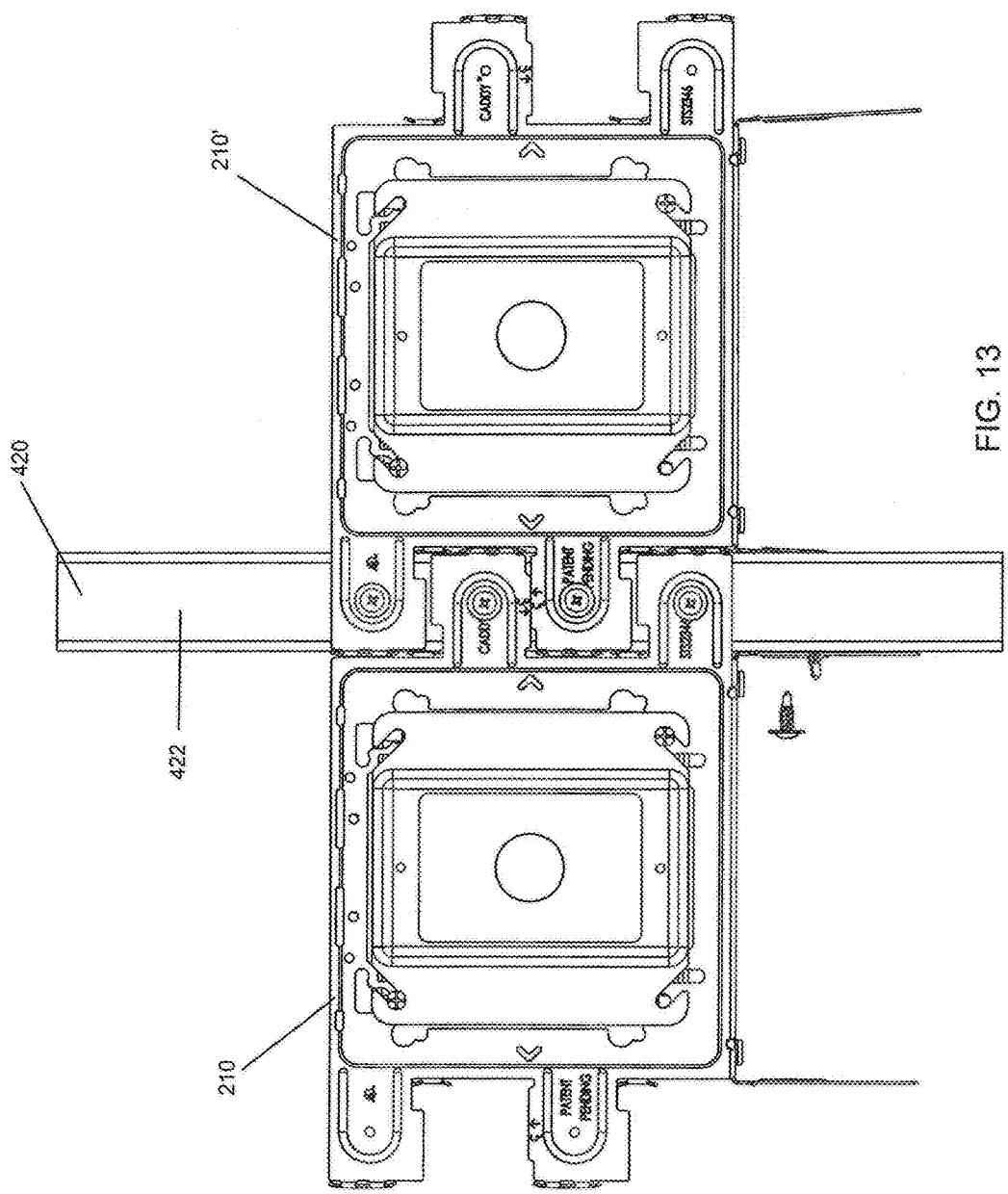
FIG. 13 is a side view of a pair of brackets of FIG. 6, with electrical boxes, installed side by side on a strut.

FIGS. 11 and 12 show coupling of an electrical box 400 and a plaster ring 410 to the electrical box bracket 210. FIGS. 13 and 14 show a pair of electrical box brackets 210 and 21O' coupled to the same strut 420, with snap-on arms of the brackets 210 and 21O' interdigitating across a front face 422 of the strut 420. The bracket 210 engages the closed side of the strut 420, with no need to bend its leg to attach the leg to the closed side of the strut 420. The bracket 210', on the open side of the strut 420, has to have its leg bent out to reach the side of the strut 420.

Many variations described above are also applicable for the bracket 210. The bracket 210 provides many of the same advantages described above with regard to the bracket 10 (FIG. 1). The bracket 210 also provides additional advantages, such as enhanced stiffness of many parts, and increased versatility in configuring its far-side support.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mounting bracket to secure a component to a support member, the mounting bracket comprising:
    a mounting portion configured to support the component with the component disposed at least partly along a first side of the support member;
    a first snap-on arm extending from a first side of the mounting portion; and
    a second snap-on arm extending from a second side of the mounting portion;

the first snap-on arm including a first portion extending away from the mounting portion and configured to overlie a front face of the support member;

the first snap-on arm further including a second portion extending at an angle relative to the first portion, the second portion including a snap-on feature that is configured to engage a second side of the support member, opposite the first side, when the first portion of the first snap-on arm overlies the front face of the support member, to secure the mounting bracket to the support member; and the first and second snap-on arms being offset from each other in a direction that extends in parallel with an elongate direction of the support member.

2. The mounting bracket of claim 1, wherein the snap-on feature is configured as a snap-on tab that extends from a body of the second portion.

3. The mounting bracket of claim 1, with the support member configured as a stud that includes a closed side and an open side, wherein, with the mounting bracket in a first orientation relative to the stud, the snap-on feature is configured to engage the open side of the stud to secure the mounting bracket to the stud; and wherein, with the mounting bracket in a second orientation relative to the stud, the snap-on feature is configured to engage the closed side of the stud to secure the mounting bracket to the stud.

4. The mounting bracket of claim 3, with the open side of the stud including a lip adjacent to the front face, wherein the snap-on feature is configured to engage the open side of the stud at the lip.

5. The mounting bracket of claim 1, further comprising:
a support feature connected to the mounting portion;
wherein, with the snap-on feature engaging the second side of the support member, the support feature is disposed to engage the first side of the support member to further secure the mounting bracket to the support member.

6. The mounting bracket of claim 5, wherein the support feature includes a plurality of wings configured to engage the first side of the support member.

7. The mounting bracket of claim 5, wherein the support feature includes a support tab extending rearward relative to the mounting portion.

8. The mounting bracket of claim 7, wherein the support feature further includes a locking tab that extends away from the support tab; and wherein the locking tab is configured to engage the second side of the support member.

9. The mounting bracket of claim 8, with the support member configured as a stud that includes a closed side and an open side, wherein, with the mounting bracket in a first orientation relative to the stud, the locking tab is configured to engage the open side of the stud and the snap-on feature is configured to engage the closed side of the stud to secure the mounting bracket to the stud; and wherein, with the mounting bracket in a second orientation relative to the stud, the locking tab is configured to engage the closed side of the stud and the snap-on feature is configured to engage the open side of the stud to secure the mounting bracket to the stud.

10. The mounting bracket of claim 9, with the open side of the stud including a lip adjacent to the front face, wherein the locking tab and the snap-on feature are configured to engage the open side of the stud at the lip.

11. The mounting bracket of claim 1, further comprising:
a foldable leg configured to be arranged by an end user to engage the support member at different distances from the mounting portion, to support the mounting portion relative to the support member.

12. A mounting arrangement to secure a mounting bracket to a support member, the mounting bracket being configured to support a component with the component disposed at least partly along a first side of the support member, the mounting arrangement comprising:

a snap-on arm mechanically coupled to the mounting bracket and configured to mechanically engage multiple surfaces of the support member to secure the mounting bracket to the support member; and a foldable leg configured to be arranged by an end user to engage the support member at different distances from the component, to support the component relative to the support member;

the snap-on arm extending away from the mounting bracket and including a bend that separates a first portion of the snap-on arm from a second portion of the snap-on arm;

the first portion of the snap-on arm being configured to contact a front face of the support member; and the second portion of the snap-on arm including a biased tab configured to contact a second side of the support member, opposite the first side of the support member, when the first portion of the snap-on arm contacts the front face of the support member, to secure the mounting bracket to the support member.

13. The mounting arrangement of claim 12, with the support member configured as a stud that includes a closed side and an open side, wherein, with the mounting bracket in a first orientation relative to the stud, the biased tab contacts the open side of the stud to secure the mounting bracket to the stud; and wherein, with the mounting bracket in a second orientation relative to the stud, the biased tab contacts the closed side of the stud to secure the mounting bracket to the stud.

14. The mounting arrangement of claim 13, with the open side of the stud including a lip adjacent to the front face, wherein the biased tab contacts the open side of the stud at the lip.

15. The mounting arrangement of claim 12, further comprising:
a support tab mechanically coupled to the mounting bracket;
wherein, with the biased tab of the snap-on arm contacting the second side of the support member the support tab contacts the first side of the support member to further secure the mounting bracket to the support member.

16. The mounting arrangement of claim 15, wherein the biased tab of the snap-on arm is a first biased tab; and wherein the support tab includes a second biased tab configured to contact the second side of the support member.

17. The mounting arrangement of claim 16, with the support member configured as a stud that includes a closed side and an open side with a lip, wherein the first biased tab and the second biased tab are configured to contact the open side of the stud at the lip.

18. A bracket to secure an electrical-system component to a stud, the stud having front face the bracket comprising:
a mounting portion configured to receive the electrical-system component;
a first plurality of stud engagements extending from a first side of the mounting portion and being configured to engage the front face of the stud and at least one side of the stud, to attach the bracket to the stud; and a second plurality of stud engagements extending from a second side of the mounting portion and being configured to engage the front face of the stud and at least one side of the stud, to attach the bracket to the stud;

each stud engagement of the first and second pluralities of stud engagements including an engagement member with a bend and a biased engagement feature that is disposed on an opposite side of the bend from the mounting portion; and the first plurality of stud engagements being offset from the second plurality of stud engagements in a direction that extends in parallel with an elongate direction of the stud.

19. The bracket of claim 18, with the stud including a closed side and an open side, wherein the biased engagement features of the first plurality of stud engagements are configured to:

with the bracket in a first orientation relative to the stud, engage the open side of the stud to secure the bracket to the stud; and with the bracket in a second orientation relative to the stud, engage the closed side of the stud to secure the bracket to the stud.

20. The bracket of claim 18, wherein, due to the offset between the first plurality of stud engagements and the second plurality of stud engagements, the bracket is configured so that with a first instance of the bracket secured to the stud using the respective first plurality of stud engagements and with a second instance of the bracket secured to the stud using the respective second plurality of stud engagements, the mounting portions of the first and second instances of the bracket are aligned at a common height relative to the stud, without the first plurality of stud engagements of the first instance of the bracket overlapping with the second plurality of stud engagements of the second instance of the bracket.

* * * * *